May 14, 1957   D. T. O'CONNOR   2,792,502
HIGH SENSITIVITY FLUOROSCOPE
Filed Feb. 6, 1953   3 Sheets-Sheet 1

INVENTOR
DONALD T. O'CONNOR

BY
ATTORNEYS

May 14, 1957  D. T. O'CONNOR  2,792,502
HIGH SENSITIVITY FLUOROSCOPE
Filed Feb. 6, 1953  3 Sheets-Sheet 3

INVENTOR
DONALD T. O'CONNOR

BY
ATTORNEYS

2,792,502

HIGH SENSITIVITY FLUOROSCOPE

Donald T. O'Connor, Laurel, Md., assignor to the United States of America as represented by the Secretary of the Navy Application February 6, 1953, Serial No. 335,620

21 Claims. (Cl. 250—52)

(Granted under Title 35, U. S. Code (1952), sec. 266)

The invention described herein may be manufactured and used by or for the Government of the United States of America for governmental purposes without the payment of any royalties thereon or therefor.

This invention relates to a high sensitivity fluoroscope and more particularly to a fluoroscope designed for inspection of castings in which means is provided to rotate the specimen undergoing inspection to any desired position and in which means is provided to observe the specimen itself while viewing the fluoroscopic image thereof.

Heretofore, fluoroscopes have not been designed which are competitive with radiographic devices. This has been due to the fact that fluoroscopic images obtained were of poor sensitivity or low quality. The presently disclosed apparatus provides a combination of a high power small focal spot X-ray tube with projection magnification to insure a clear image. By employing projection magnification space is provided between the tube and screen so that the specimen may be mounted within a spherical shell on a handling device which is capable of rotating the specimen to any desired position for inspection. The fluoroscopic screen is mounted in the center of a shielded glass window and the specimen is illuminated with red light so that while the image is visible on the screen the precise orientation of the specimen may be determined through the window. In addition such an arrangement permits the surface of the casting to be seen thus simplifying interpretation of the X-ray image and furthermore eye fatigue of the operator is diminished due to the interruption of fixed focus constant color viewing.

An object of the present invention is to provide a fluoroscopic apparatus having a high power small focal spot X-ray tube which utilizes projection magnification to enhance the results attained.

A further object of this invention is to provide a fluoroscope in which the specimen undergoing fluoroscopic examination may be positioned in any desired manner by means of a novel handling apparatus.

Still another object of the presently disclosed apparatus is the provision of a shielded glass viewing window having a fluoroscopic screen thereon in combination with an illuminated specimen whereby the precise orientation of the specimen may be determined while viewing the X-ray image thereof.

Other objects and many of the attendant advantages of this invention will be readily appreciated as the same becomes better understood by reference to the following detailed description when considered in connection with the accompanying drawings wherein.

Figure 1:
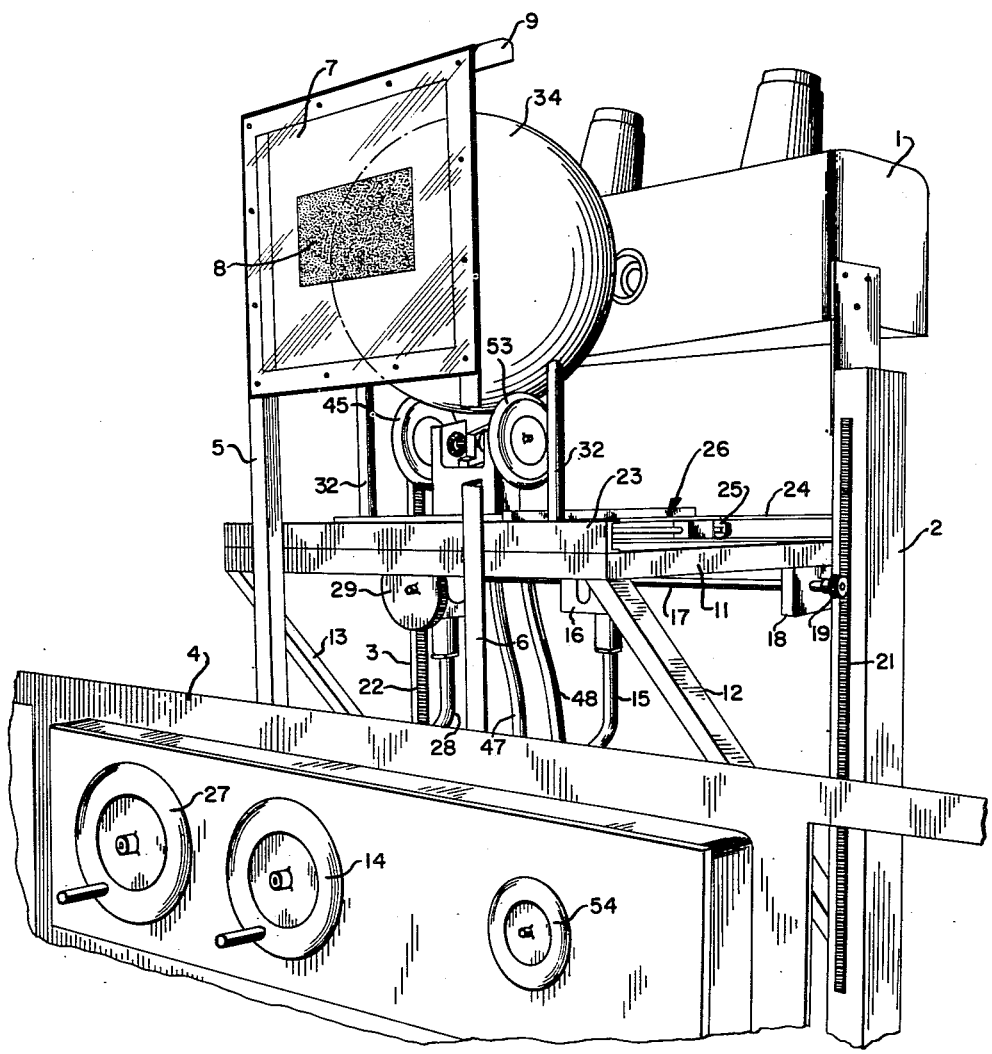
Fig. 1 is a perspective view of the fluoroscopic apparatus herein disclosed.

Referring now to the drawings and more particularly to Fig. 1 it can be seen that there is shown generally at 1 an X-ray tube. This tube has a small focal spot and a relatively high power requirement. The tube 1 is supported by means of brackets on uprights 2 and 3. The tube and handling apparatus is housed within a shielded cabinet (not shown) a portion of the front panel of which is shown at 4. Supported by uprights 5 and 6 is a shielded glass window 7 which may be a lead silicate glass. Mounted in the center portion of this window is a fluoroscopic screen 8 which may be of any suitable variety but is preferably one having satisfactory brightness and energy response and a low value for screen unsharpness, such as, for example, a screen commercially known as "Radelin F." Further mounted on the supports 5 and 6 is a shield 9 for a red lamp to illuminate the specimen for a purpose to be more fully described hereinafter.

There is provided a rectangular frame 11 which has supporting braces 12 and 13 extending downwardly therefrom to engage braces (not shown) extending downwardly from the rear portion of frame 11. The frame and bracing structure are vertically slidable by operation of hand wheel 14. This hand wheel through flexible shaft 15 and gear box 16 drives shaft 17 journalled in suitable block at each end thereof such as shown at 18. Mounted on the ends of shaft 17 are pinions 19 (one shown) which engage racks 21 and 22 mounted on uprights 2 and 3 respectively. It can be seen that by virtue of the aforesaid mechanism the frame 11 may be raised and lowered by rotating hand wheel 14.

Figure 2:
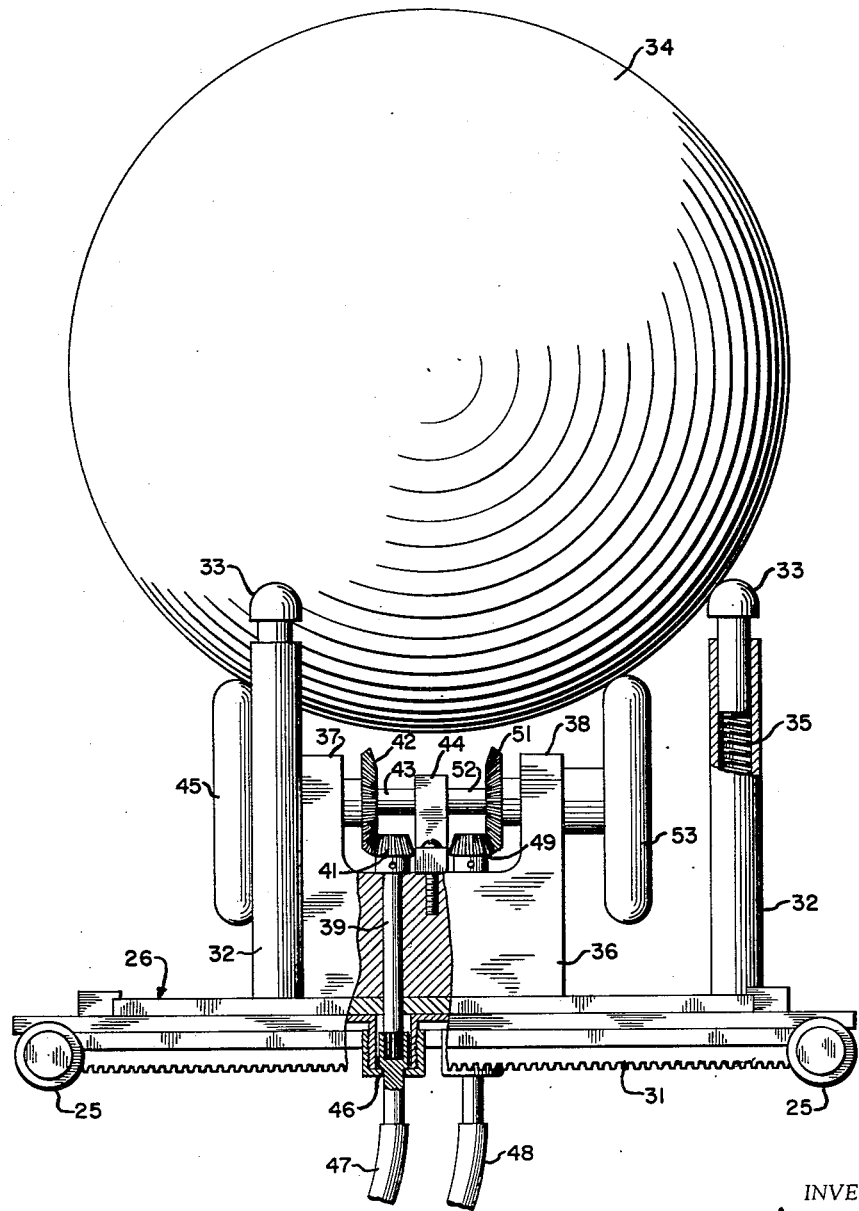
Fig. 2 is an elevational view partly in section of the handling apparatus.

Mounted on the upper surface of frame 11 is a pair of U-shaped members 23 and 24 which serve as a trackway for rollers 25 mounted on the specimen handling apparatus which is generally designated by the numeral 26. Rotatably mounted in the front panel 4 is a hand wheel 27 which drives a flexible shaft 28 to rotate pinion 29. Referring to Fig. 2 it can be seen that the bottom plate of the handling apparatus 26 is provided with a rack 31 which engages the pinion 29. Thus the hand wheel 27 can be rotated to shift the handling apparatus 26 horizontally on frame 11.

The handling apparatus 26 (Fig. 2) has mounted thereon three upwardly extending sleeves 32 (two shown) having cushions 33 disposed in the upper ends thereof which form a triangular support for the sphere 34. The cushions are resiliently supported by springs 35 which are disposed in sleeves 32. Secured to the center portion of the bottom plate of the handling apparatus is a block 36 having upwardly extending end portions 37 and 38. A bore is provided in block 36 for the passage of shaft 39 having bevel gear 41 mounted thereon. This bevel gear engages gear 42 mounted on shaft 43 which is journalled in a collar 44 and portion 37 of block 36. Shaft 43 extends through portion 37 and has secured to the outer end thereof a disc or wheel 45 which is provided with a rubber rim. The lower end of shaft 39 has secured thereto by means of coupling 46 a flexible shaft 47. It can be seen that rotation of shaft 47 will cause corresponding rotation of disc 45. Similarly flexible shaft 48 connects through bevel gears 49 and 51 and shaft 52 with disc 53. It is apparent that, when discs 45 and 53 are rotated in the same direction, sphere 34 will rotate on a horizontal axis and, when discs 45 and 53 are rotated in opposite directions, sphere 34 will rotate on a vertical axis.

Figure 3:
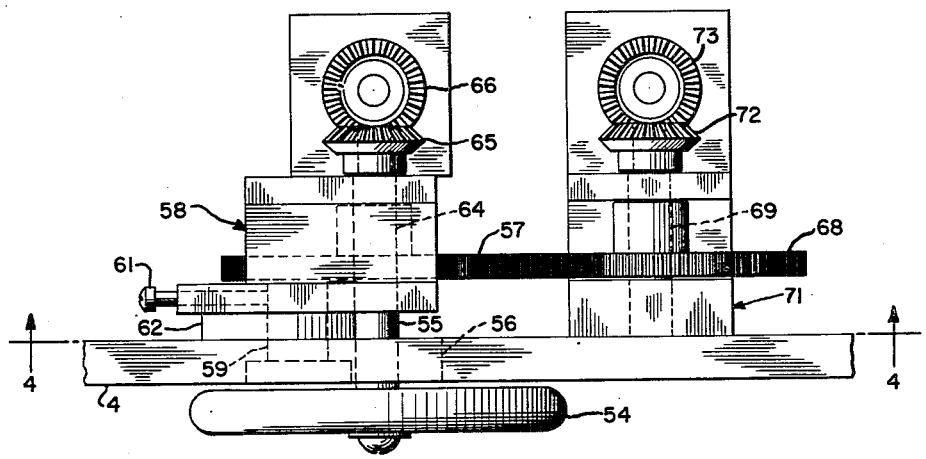
Fig. 3 is a plan view of the means employed to operate the handling apparatus.
Figure 4:
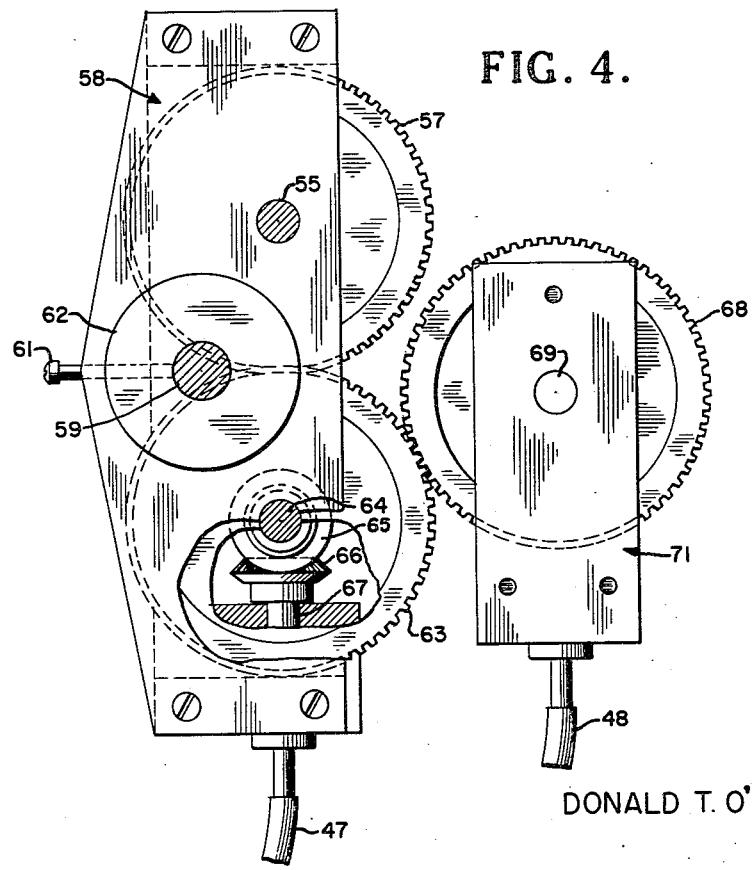
Fig. 4 is a sectional view along the line 4—4 of Fig. 3.

The operation of the discs is controlled by a hand wheel 54 mounted in the front panel 4. The details of the operating means are shown in Figs. 3 and 4. A shaft 55 secured to hand wheel 54 extends through an elongated slot 56 in front panel 4 and has mounted thereon a gear 57. The shaft 55 is journalled within a gear housing 58 which is pivoted to panel 4 by means of pivot pin 59. Pivot pin 59 is held on the gear housing by means of set screw 61 and a bushing 62 is interposed between the housing and front panel. Gear 57 engages gear 63 mounted on shaft 64 which has a bevel gear 65 mounted thereon. Bevel gear 65 meshes with bevel gear 66 which is mounted on the end portion of a shaft 67 which in turn is secured to flexible shaft 47. Thus rotation of hand wheel 54 causes rotation of shaft 47. It can be seen that gear 63 engages a gear 68 which is mounted on a shaft 69 journalled in a frame 71 which is secured to panel 4. Mounted on shaft 69 is a bevel gear 72 which engages bevel gear 73 to rotate flexible shaft 48. With the gears in the position shown rotation of hand wheel 54 will cause rotation in opposite direction of shafts 47 and 48 and hence rotation in the same direction of discs 45 and 53. By shifting gear housing 58 and hand wheel 54 on pivot 59 gear 63 is disengaged from and gear 57 is engaged with gear 68. In this position rotation of the hand wheel causes rotation in the same direction of shafts 47 and 48 and hence rotation in opposite directions of discs 45 and 53. In this manner the position of the sphere 34 may be adjusted at will.

The operation of the presently disclosed device is as follows. A specimen to be inspected is placed within the sphere 34 which is a transparent shell composed of two sections. The specimen is retained thereby by any suitable means such as, for example, between inflated balloons which serve to hold the specimen at the center of the sphere. The sphere is then placed on the handling apparatus and is supported by cushions 33 and discs 45 and 53. The entire assembly may be raised and lowered or shifted horizontally by operating hand wheels 14 or 27 respectively. By operating the hand wheel 54 the specimen may be oriented as desired. Upon operation of the X-ray tube 1 the image of the specimen appears on the fluoroscopic screen 8 through projection magnification. By illuminating the red light retained within cover 9 the specimen itself may be viewed through window 7. Such an arrangement has many advantages since the operator is able to determine the exast orientation of the specimen while viewing the image. Furthermore, eye fatigue of the operator is reduced due to the interruption of fixed-focus, constant color viewing. The versatility of the fluoroscopic apparatus herein disclosed permits it to be used for critical inspection of castings with an accuracy previously obtainable only by the use of X-ray negatives.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent in the United States is:

1. In a fluoroscopic apparatus of the class disclosed, in combination, an X-ray tube for projecting a beam of X-rays and having a small focal spot, a spherical shell for holding a specimen in the path of said beam, a source of luminous energy impinging upon said shell to illuminate a specimen therein, means for supporting said shell, said supporting means including means for rotating said shell to any position, a shielded transparent window, and a fluoroscopic screen so disposed within said window as to provide a fluorescent screen portion and a transparent portion in said window for enabling from a point externally of said apparatus simultaneous observation of the image of the specimen cast on said fluorescent screen and of the specimen proper through said transparent portion.

2. A fluoroscope including a high power small focal spot X-ray tube for projecting a beam of X-rays, a transparent spherical shell for retaining a specimen to be X-rayed in the path of said beam, a source of luminous energy impinging upon said shell to illuminate a specimen therein, means for supporting said spherical shell including a pair of rotatable circular plates, said plate being disposed in parallel planes, means for rotating said plates to position the specimen at will, a shielded transparent glass window having a fluoroscopic screen disposed over a portion of said window to provide a flucrescent screen portion and a transparent portion in said window whereby from a point externally of said fluoroscope the illuminated specimen may be visible through the transparent portion of the window while the X-ray image of the specimen is viewable through the fluoroscopic screen.

3. In a handling means for a specimen adapted to be retained within a spherical shell, a plate having three sleeves extending upwardly therefrom, spring means disposed within said sleeves, cushions supported by said spring means and adapted to support the spherical shell, a pair of rotatable and mutually parallel discs engaging the spherical shell, gear means for rotating said discs, and shiftable means engaging said gear means for selectively rotating said discs in the same or opposite directions whereby the shell may be rotated to position the specimen in any desired manner.

4. In a supporting device for a spherical shell adapted to retain a specimen for fluoroscopic examination, a supporting plate, a plurality of supporting fingers extending upwardly from said plate for supporting the spherical shell, a pair of discs mounted on said plate and rotatable in planes normal to said plate, a pair of cables operatively connected to said discs, and control means operatively connected to said cables, said control means including a shiftable element to selectively rotate said discs in the same or opposite directions in accordance with the selected position of said shiftable element to vary the positioning of a specimen within the spherical shell.

5. A fluoroscopic device for X-ray examination of specimens comprising, in combination, a small focal spot high power X-ray tube projecting a beam of X-rays, a transparent spherical shell for retaining a specimen in the path of said beam, means for illuminating the retained specimen with red light, supporting means for said shell, said supporting means including a pair of rotatable and parallelly arranged discs, means for rotating said discs selectively in the same or opposite directions to position the shell at will, a shielded transparent glass window, a fluoroscopic screen mounted over a portion of said window to provide a fluorescent screen section and a transparent section in said window to enable from a position externally of said device the simultaneous visual inspection of the orientation of the retained specimen through said transparent section and of the X-rayed image of the retained specimen cast on said fluorescent section.

6. In a fluoroscopic apparatus, a source for projecting a beam of X-rays in a preselected direction and having a small focal spot, means for rotatably supporting an article to be inspected in the path of said beam, a source of luminous energy impinging upon said means to illuminate the article, a shielded window mounted for receiving at least a portion of said beam, said window having a fluoroscopic section upon which the X-rayed image of the article is cast and having a transparent section through which the specimen is capable of being viewed from a point externally of said apparatus.

7. In a fluoroscopic device for examination of specimens, a source for projecting a beam of X-rays in a preselected direction and having a small focal spot, rotatable supporting means for holding a specimen in any desired position in the path of said beam, a source of red light impinging upon said supporting means for illuminating the specimen, a shielded transparent glass window mounted in a plane perpendicular to the median of said beam and disposed for receiving at least a portion of said beam, a fluorescent screen interposed between said source and said window in contiguous relation with said glass window in a plane parallel to the plane of said window and positioned to receive the X-rayed image of the specimen being examined, the planar area of said screen being less than the planar area of said window to thereby enable simultaneous visual inspection of the specimen from a position externally of said device through a portion of the transparent window and observation of the image of the specimen cast on said screen.

8. In a fluoroscopic device having a small focal spot X-ray tube for X-ray examination of specimens and a multi-axes rotatable supporting structure for holding and orienting specimens, a viewing arrangement comprising a transparent shielded window of predetermined planar area, a fluorescent screen of planar area less than said predetermined area positioned to receive the X-rayed image of the specimens, said screen being mounted on said window and centrally aligned therewith to thereby provide in said window a centrally disposed fluorescent area perimetrically bounded by a transparent area, and a visible light source to illuminate specimens to be tested, said transparent area being pervious to waves of said visible light source.

9. A fluoroscopic apparatus for X-ray examination of specimens comprising, an X-ray tube having a small focal spot for projecting a beam of X-rays in a preselected direction, a transparent spherical shell for retaining specimens to be X-rayed in the path of said beam, and means supporting said shell and adapted to orient the specimens as desired for X-raying, said means including an adjustable carriage mounted for horizontal and vertical movement, tripodic means fixedly mounted on said carriage and supporting said shell at three points of contact, rotating means interposed between the legs of said tripodic means for further supporting said shell at two additional points of contact and for imparting motion to said shell at the said two additional points of contact to orient said shell in any desired position, said two points of contact being fixed in space relative to said three points of contact for all movements of said rotating means, and dual mode operating means for driving said rotating means for imparting motion to said shell at said two additional points to selectively rotate said shell about a first axis in one mode of operation of said duel mode means and about a second axis in the other mode of operation of said duel mode means.

10. The apparatus of claim 9, wherein said second axis is normal to said first axis.

11. The apparatus of claim 9, wherein said first axis is a horizontal axis and the second axis is a vertical axis.

12. The apparatus of claim 9, wherein the axis of rotation of the rotating means is the same for both modes of operation of said dual mode means.

13. The apparatus of claim 9, wherein for any preselected fixed position of the carriage the axis of rotation of the rotating means remains fixed for both modes of operation of said dual mode means.

14. In a fluoroscopic apparatus, a source for projecting a beam of X-rays in a preselected direction and having a small focal spot, a hollow supporting body having at least a part of its periphery of curved formation for retaining spcimens to be X-rayed in the path of said beam, a source of red light for illuminating specimens retained in said body, a transparent shielded window of predetermined planar area, a fluorescent screen of planar area less than said predetermined area positioned to receive the X-rayed image of the specimens, said screen being centrally disposed in said window to provide in said window a fluorescent area perimetrically bounded by a transparent area through which the illuminated specimens may be observed from a position externally of said apparatus, and means supporting said body and adapted to position the specimens as desired for X-raying, said means including a carriage, multi-contact supporting means fixedly mounted on said carriage for supporting said body, rotatable supporting means mounted on said carriage so that the axis of rotation of said supporting means is fixed with respect to said carriage, said rotatable supporting means supporting the body for rolling movement in the path of the projected X-rays by contact with the said curved periphery, and means for selectively controlling said rotatable supporting means to impart a first motion to said body at the point of contact with said curved periphery for rotating said body about a first axis or to impart a second motion to said body at the point of contact with said curved periphery for rotating said body about an axis normal to said first axis.

15. A fluoroscopic apparatus for X-ray examination of specimens comprising, an X-ray tube having a small focal spot for projecting a beam of X-rays in a preselected direction, a transparent spherical shell for retaining specimens to be X-rayed in the path of said beam, and means supporting said shell and adapted to orient the specimens as desired for X-raying, said means including an adjustable carriage mounted for horizontal and vertical movement, tripodic means fixedly mounted on said carriage for supporting said shell, a pair of rotatable discs supporting the shell for rolling movement in the path of the projected X-rays, said discs being mounted on said carriage so that the axis of rotation of said discs is in the same plane for all positions of said carriage and is fixed with respect to said carriage, individual driving means for each of said discs, and a shiftable element selectively having a first position and a second position, said shiftable element when in said first position directly engaging one of said individual driving means to rotate said discs in the same direction to thereby rotate said shell about a horizontal axis and when in said second position directly engaging both of said individual driving means to rotate said discs in opposite directions to thereby rotate said shell about a vertical axis.

16. A device for inspection or display comprising, a receiving body having at least a part of its periphery formed by a curved surface, rotatable supporting means supporting the body for rolling movement by contact with the said curved surface, said means having a common axis of rotation, and control means for selectively controlling said rotatable supporting means to impart in a first selected position of said control means a first motion to said body at the point of contact with said curved surface for rotating said body about a horizontal axis and to impart in a second selected position of said control means a second motion to said body at the point of contact with said curved surface for rotating said body about a vertical axis.

17. In a handling device for inspection or display of an object to be retained within a rotatable body, a carriage, tripodic means fixedly mounted on said carirage for supporting said body, a pair of rotatable discs mounted on said carriage supporting said body for rolling movement, said discs being mounted on said carriage so that the axis of rotation of said discs is fixed with respect to said carriage, a first driving gear means connected to one of said discs for rotating said one disc, a second driving gear means adaptable to selectively rotate the other disc only or to rotate both of said discs simultaneously, and a shiftable gearing element having a first position to engage said second gear means to permit said second gear means to rotate both of said discs simultaneously and having a second position to engage simultaneously said first gear means and said second gear means to permit said first gear means to rotate the said one disc independently of said second gear means and to permit said second gear means to rotate the said other disc only.

18. A rotatable supporting system comprising, a carriage, tripodic supporting means fixedly mounted on said carriage, a first rotatable disc mounted on said carriage, a second rotatable disc mounted on said carirage, said first and second discs having a common axis of rotation which is fixed with respect to said carriage, and driving means operatively connected to said first and second discs and movable selectively to a first position to rotate said discs in the same direction about said common axis and to a second position to rotate said discs in opposing directions about said axis.

19. In a supporting system for rotatably supporting a body having at least a part of its periphery formed by a curved surface, tripodic means supporting said body at three points of contact with said curved surface, rotating means interposed between the legs of said tripodic means for further supporting said body at two additional points of contact with said curved surface and for imparting motion to said shell at the said two additional points of contact to orient said shell in any desired position, said two points of contact being fixed in space relative to said three points of contact for all movements of said rotating means, and dual mode operating means for driving said rotating means for imparting motion to said body at said two additional points of contact to selectively rotate said body about a horizontal axis in one mode of operation of said dual mde means and about a vertical axis in the other mode of operation of said dual mode means.

20. In a handling aparatus for rotatably supporting a body by frictional contact of rotating means with said body, a gearing arrangement for driving said rotating means and comprising in combination, a pair of independently rotatable gears mounted for rotation about a common axis, a first flexible driving cable operatively connected to one of said pair of gears, a second flexible driving cable operatively connected to the other of said pair of gears, a first gear having a fixed axis of rotation connected to drive said first cable for rotating the said one of said pair of gears, a second gear selectively shiftable to a first axis or to a second axis of rotation and connected to drive said second cable for rotating the said other of said pair of gears, and a third gear shiftable in unison with said second gear and having a first position corresponding with said first axis and a second position corresponding with said second axis, said first, second, and third gears being so arranged that when said third gear is in said first position said second gear is effective to rotate said pair of gears and when said third gear is in said second position said third gear is effective to rotate said pair of gears.

21. In a fluoroscopic apparatus for X-ray examination of spcimens, an X-ray tube having a small focal spot for projecting a beam of X-rays in a preselected direction, rotatable supporting means for holding and orienting a specimen to be X-rayed in the path of said beam, a source of light for illuminating said specimen held in said shell, a shielded transparent glass window mounted in a plane perpendicular to the median of said beam and disposed to receive at least a portion of said beam, a fluorescent screen interposed between said source and said window adjacent to said glass window in a plane parallel to the plane of said window and positioned to receive the X-rayed image of said specimen, the planar area of said screen being less than the planar area of said glass window and the center of the area of said screen corresponding with the center of said glass window to thereby provide a transparent area circumjacent to said screen, whereby the orientation of said specimen and the X-ray image thereof may be simultaneously observed through said circumjacent transparent area and the screen, respectively, from a point externally of said apparatus.

References Cited in the file of this patent

UNITED STATES PATENTS

| | | |
|---|---|---|
| 2,116,633 | Long | May 10, 1938 |
| 2,217,262 | Tunnicliffe | Oct. 8, 1940 |
| 2,289,877 | Dreyer | July 14, 1942 |
| 2,298,942 | Hicks | Oct. 13, 1942 |
| 2,305,082 | Hocott | Dec. 15, 1942 |
| 2,344,454 | Plotner | Mar. 14, 1944 |
| 2,585,120 | Harrington | Feb. 12, 1952 |

FOREIGN PATENTS

| | | |
|---|---|---|
| 564,748 | Great Britain | Oct. 11, 1944 |